(12) United States Patent
McAlpine et al.

(10) Patent No.: US 6,171,526 B1
(45) Date of Patent: Jan. 9, 2001

(54) METHOD FOR MAKING A GROOVED SPACER FOR A TELECOMMUNICATIONS CABLE

(75) Inventors: Warren W. McAlpine, Hickory; MaryAnn Clarke, Granite Falls, both of NC (US)

(73) Assignee: Siecor Corporation, Hickory, NC (US)

( * ) Notice: Under 35 U.S.C. 154(b), the term of this patent shall be extended for 0 days.

(21) Appl. No.: 09/067,438

(22) Filed: Apr. 28, 1998

Related U.S. Application Data

(63) Continuation of application No. 08/476,389, filed on Jun. 7, 1995, now Pat. No. 6,066,798.

(51) Int. Cl.[7] .................................................. B29C 47/90
(52) U.S. Cl. ................. 264/1.25; 264/1.29; 264/177.16; 264/177.17; 264/178 R; 264/237; 264/348
(58) Field of Search ................................. 264/1.25, 1.29, 264/177.1, 177.16, 177.19, 348, 101, 237, 177.17, 178 R; 425/113, 114, 380, 461, 466, 467

(56) References Cited

U.S. PATENT DOCUMENTS

| | | | |
|---|---|---|---|
| 2,728,104 | 12/1955 | Fisch | 264/177.17 |
| 3,538,210 | 11/1970 | Gatto | 264/90 |
| 4,272,472 | 6/1981 | Hulin et al. | 264/146 |
| 4,474,426 | 10/1984 | Yataki | 350/96.23 |
| 4,528,148 | 7/1985 | Dotti | 264/1.5 |
| 4,548,567 | 10/1985 | Missout | 264/1.29 |
| 4,575,326 | 3/1986 | French | 425/71 |
| 4,703,132 | 10/1987 | Marciano-Agostinelli | 174/23 |
| 4,790,970 | 12/1988 | Kurth et al. | 264/130 |
| 4,814,133 | 3/1989 | Matsuno et al. | 264/174 |
| 4,872,824 | * 10/1989 | Williams et al. | 425/113 |
| 5,053,091 | 10/1991 | Giljam et al. | 156/66 |
| 5,146,046 | 9/1992 | Arroyo et al. | 174/23 |
| 5,188,883 | 2/1993 | Fawlyk | 428/189 |
| 5,371,144 | 12/1994 | Brosius et al. | 515/193 |
| 5,380,472 | 1/1995 | Schneider | 264/1.29 |
| 5,505,897 | 4/1996 | Wise et al. | 264/565 |

FOREIGN PATENT DOCUMENTS

| | | | |
|---|---|---|---|
| 86623 | 8/1983 | (EP) . | |
| 2015418 | 9/1979 | (GB) . | |
| 2 172 544 | * 9/1986 | (GB) | 264/1.29 |
| 835795 | 6/1981 | (SU) . | |

\* cited by examiner

*Primary Examiner*—Jill L. Heitbrink
*Assistant Examiner*—Stefan Staicovici
(74) *Attorney, Agent, or Firm*—Timothy J. Aberle

(57) ABSTRACT

A calibration apparatus and method for making a grooved plastic spacer for a slotted core telecommunications cable. The method includes attaching a calibration apparatus having helically shaped calibration members to an extrusion die. The calibration members are inserted into respective grooves of the spacer so that, as the spacer exits from the die, the calibration members maintain the shape of the grooves until the spacer is sufficiently cooled.

8 Claims, 7 Drawing Sheets

METHOD FOR MAKING A GROOVED SPACER FOR A TELECOMMUNICATIONS CABLE

This application is a Continuation of application Ser. No. 08/476,389 Jun. 7, 1995, now U.S. Pat. No. 6,066,798.

BACKGROUND OF THE INVENTION

The field of the invention is telecommunication cables having cylindrical spacers having open exterior grooves for the insertion therein of longitudinally extending telecommunications members such as insulated copper wires or coated light waveguides or ribbons containing light waveguides. Such cables are sometimes referred to as slotted core cables. The invention concerns apparatus and methods for the manufacture of the grooved spacer, sometimes called the slotted core.

It is well known that such grooved spacers may comprise a layer of plastic extruded over a core strength member. One or more grooves are formed in the external surface of the plastic, and a telecommunications member is inserted into a groove. The grooves may follow paths which are helical in shape or which have a direction of lay which reverses at periodic intervals.

With the more recent trend toward inserting a stack of light waveguide ribbons in a groove, especially in cables having a high fiber count and high fiber density, irregularities in the exact shape of the floor and walls of U-shaped grooves become more significant in the performance of the cable. The portions of the plastic material between adjacent grooves and forming the groove walls are referred to as the ribs of the spacer. Even if the grooves are initially extruded having the desired U-shape, a wall of a groove may slump inward into the groove due to the force of gravity, the angular momentum on the legs caused by rotating the spacer during manufacturing, or flow in the extruded melt due to cooling effects. Spacers of high density cables become more susceptible to slumping as the width of the grooves increases to accommodate wider ribbons having more light waveguides therein, because the width of the plastic at the base of a rib between the corners at the bottom of adjacent grooves becomes smaller. The spacers also become more susceptible to slumping as the height of the grooves increases. Such wall slumping can cause unacceptable attenuation in light waveguide ribbons inserted into the groove, especially when the cable is bent.

Hulin, U.S. Pat. No. 4,272,472, describes a prior art technique for making a cylindrical member having near its exterior surface a plurality of rounded ducts, each of which is almost closed at the outer surface of the cylindrical member by a pair of oppositely facing lips directed towards each other. Longitudinally extending pins mounted to a crosshead extruder tip and distributed along a circle of diameter smaller than the die opening extend downstream of the die to completely fill and delimit the ducts in the extruded member. A flexible wire having a smaller diameter than the pins is mounted at the distal end of each pin. To obtain the ducts following helical paths, the pins and the tip are rotated by a motor. A knife or wire at the distal end of each flexible wire is used to cut a narrow passage to the exterior surface of the cylindrical member between the lips of the duct. Specialized extrusion equipment is required to rotate the tip.

Yataki, U.S. Pat. No. 4,474,426, addresses the problem of exterior groove dimensional stability in a grooved spacer for telecommunications cable by grinding the grooves following extrusion of the cylindrical member. However, such grinding results in wasted plastic, introduces an extra processing step, and requires specialized equipment.

Matsuno et al., U.S. Pat. No. 4,814,133 addresses the problem of exterior groove stability in a grooved spacer for telecommunications cable by using a two-step extrusion of the plastic, to provide a central strength member, an intermediate annular plastic layer over the central strength member, and an exterior plastic layer having grooves in its exterior surface. The examples given include grooves having a depth of up to 2.4 mm in high density polyethylene (HDPE); however, groove depths of up to 1.4 mm are shown when linear low density polyethylene is used. The method reduces the volume of the plastic in the grooved exterior layer, but does not address postextrusion groove dimensional stability.

To address the problem of groove distortion in a grooved spacer for telecommunications cable when the extruded plastic spacer contacts cooling water in a cooling vat, Schneider, U.S. Pat. No. 5,380,472, provides a plurality of shaping disks housed in the cooling vat. The shaping disks have web-like projections extending radially inward toward the axis of the grooved spacer. Each projection is inserted into a groove. The shaping disks may be used in making a grooved spacer formed of HDPE having six grooves, each having a groove width of 1.5 mm and a height of 2.7 mm made using the shaping disks.

In practice, the risk of the grooved spacer becoming lodged in the shaping disks during processing is significant. The extrusion of a spacer formed of a plastic material having a melt flow index higher than that of HDPE and having grooves of a depth greater than 3.0 mm is difficult using the shaping disks. The disks must be mounted to each other by rods or the like to maintain exact spacing and helical alignment of the projections. The resulting apparatus is expensive to build and can be difficult to properly clean during a back-up of the plastic material. Other disadvantages are that the distance between the extruder die and the cooling vat cannot be adjusted after the apparatus is mounted in the cooling vat, and the apparatus is relatively intolerant to variations in the longitudinal or angular velocities of the spacer.

SUMMARY OF THE INVENTION

It is therefore an object of the present invention to provide for telecommunication cables a spacer whose grooves have more stable dimensions.

A further object of the invention is to provide grooved spacers having grooves of any desired depth in plastic having a melt flow index higher than that of HDPE.

Another object of the present invention is to provide an improved calibration apparatus which does not require specialized extrusion equipment.

Yet another object of the invention is to provide such an apparatus that is less susceptible to back-up of the plastic material than prior art shaping disks.

Still another object of the invention is to provide such an apparatus that can maintain groove stability both between the extruder die and the cooling vat and also within the cooling vat.

These and other objects are provided, according to the present invention, by providing a calibration apparatus for making a longitudinally extending spacer having at least one groove following a helical path in the exterior surface thereof into which a longitudinally extending telecommunications member may be inserted. The calibration apparatus includes a calibration device including a mounting member mounted to an extrusion die which shapes the exterior surface of the grooved spacer. The calibration device also includes a substantially rigid, longitudinally extending, helically shaped calibration member mounted to the mounting member. At least a portion of the calibration member is inserted into said groove to maintain its dimensional stability during cooling of the plastic material subsequent to its extrusion. The calibration device preferably extends into a cooling vat provided to cool the hot extruded plastic material; however, it may stop short of the cooling vat, particularly if other calibration means, such as shaping disks, are provided in the cooling vat.

Because the force of the extruded plastic on the calibration members is significant, thickened members are provided on each end of the calibration device. These thickened members may serve as mounting members, such as the mounting member which is mounted to the die.

The portion of the calibration member inserted into the groove may have a cross-sectional area in a plane perpendicular to the thread of the groove which increases, over at least part of the longitudinal extent of the inserted portion, with increasing distance from the die.

The calibration member may be inserted into the groove to a depth of at least 3.0 mm over at least part of the longitudinal extent of the calibration member.

The die for shaping extruded plastic melt may have a helically shaped passage for imparting an initial momentum to the melt in the direction of the spaces between the calibration members.

The inserted portion of the first calibration member has a cross-sectional area perpendicular to the thread of the groove which is smaller than the cross-sectional area of the groove. In particular, the depth of insertion of the first calibration member into said groove is less than the depth of the groove. In spacers having generally U-shaped grooves each having a flat bottom and two sides perpendicular thereto, the calibration member may touch both of the groove sides, but does not touch the groove bottom, The calibration apparatus may also include a second calibration device mounted by a coupling to the downstream end of the first calibration device. The second calibration device may be provided to accommodate processing lines in which the desired distance between the extruder die and the cooling vat is greater than the maximum length of an available first calibration device. Like the first calibration device, the second calibration device has thickened mounting members on each end thereof and at least one substantially rigid, longitudinally extending, helically shaped calibration member, at least a portion of the calibration member being inserted into the groove during manufacturing. A rigid cylindrical coupler having at least one wall perforation therein may be fastened at each of its ends over a thickened mounting member provided at an end of a calibration device to join the two calibration devices into a single calibration apparatus.

The depth of insertion of the second calibration member into the groove increases with increasing distance from the die for a predetermined distance from the point of the second calibration member which is nearest to the die.

Letting the number of grooves in the spacer be n, each calibration device preferably has n flights of calibration members.

If the calibration apparatus extends into the cooling vat, a vacuum apparatus may be used to create a low pressure atmosphere condition in the cooling vat to withstand through a difference in air pressure the outward flow of liquid coolant from the cooling vat along the grooved spacer. A vacuum, blast pipe, or other means preventing the liquid from reaching the extruder crosshead should be used.

In order to align one calibration member with the die or to align two calibration members located at longitudinally spaced apart positions along the processing line, a rod having one or more helically shaped external grooves therein having the same pitch as the groove of the spacer may be inserted over each of the calibration members and to the entrance of the die.

The apparatus and methods described herein may advantageously be used in providing telecommunications cable spacers having grooves of a desired depth made of plastic material having a relatively high melt flow index. For instance, the plastic material may have a melt flow index of equal to or greater than about 0.65 g/10 min. Such a telecommunications cable comprises a longitudinally extending spacer having at least an outer layer thereof formed of the plastic material, which plastic material may be formed over an axial strength member. Formed in at least the outer layer of the spacer are a plurality of longitudinally extending grooves each following helical paths, each groove for supporting a longitudinally extending telecommunications member therein. Each of said grooves may have a cross-sectional shape transverse to its longitudinal extent generally in the form of a "U" with a flat bottom, two corners, and two sides, each side substantially perpendicular to said bottom and joined to said bottom at a corner, and a plurality of longitudinally extending ribs, each rib between two adjacent grooves and each rib delimiting two of said groove sides. Each rib may have a longitudinally extending base between adjacent groove bottom corners whose thickness does not exceed about 1.3 mm. An outer jacket surrounds the spacer, and a water blocking material may be disposed between said spacer and said outer jacket.

BRIEF DESCRIPTION OF THE DRAWINGS

The preferred embodiments of the invention are described in the several drawings, in which.

DETAILED DESCRIPTION OF THE INVENTION

The present invention will now be described more fully hereinafter with reference to the accompanying drawings, in which one or more preferred embodiments of the invention are shown. This invention may, however, be embodied in many different forms and should not be construed as limited to the embodiments set forth herein; rather, these embodiments are provided so that the disclosure will fully convey the scope of the invention to those skilled in the art. Like numbers refer to like elements throughout. The drawings are not necessarily drawn to scale but are configured to clearly illustrate the invention.

Figure 1:
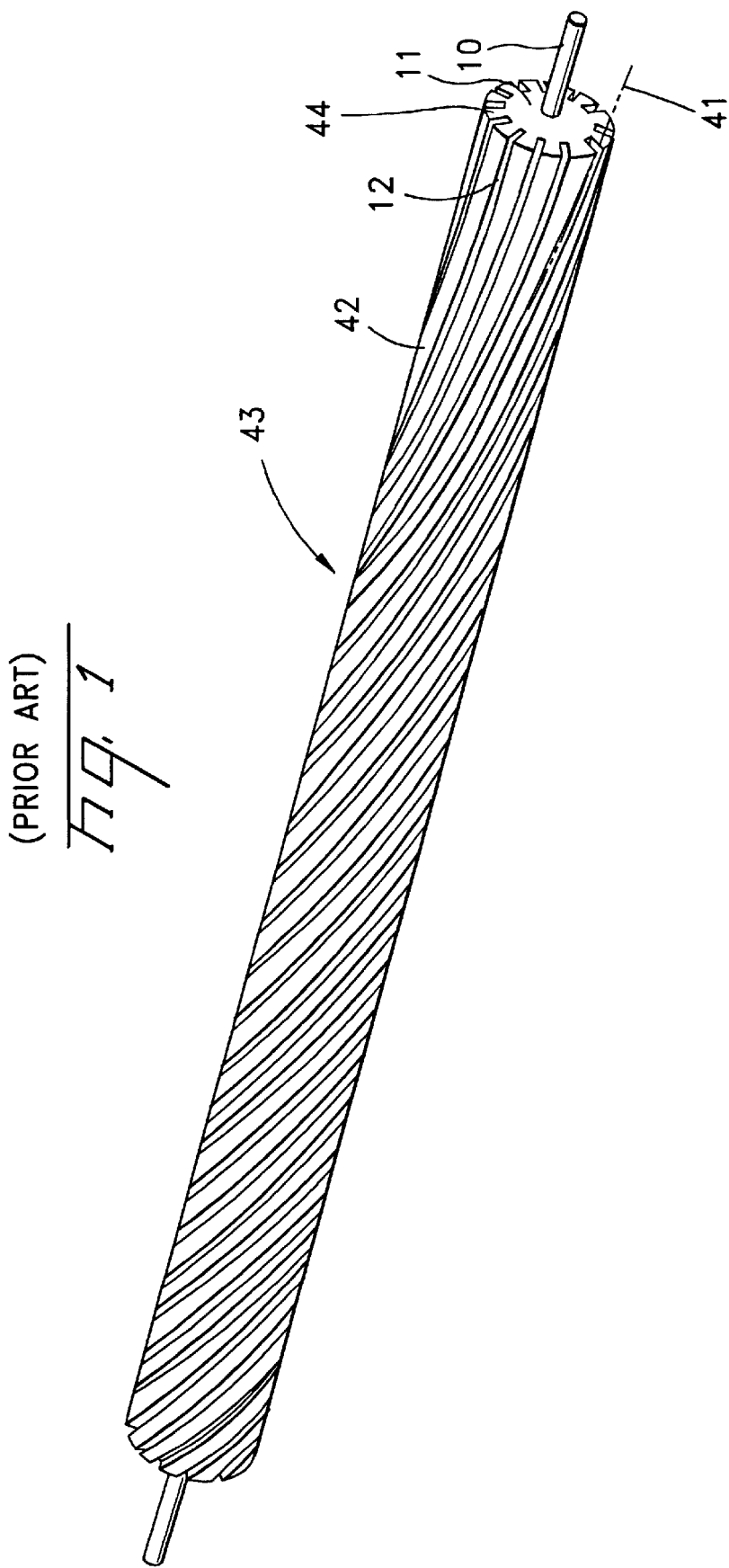
FIG. 1 is a perspective view of a prior art grooved spacer.

A typical prior art grooved spacer 43, sometimes called a slotted core rod, is shown in FIG. 1. Grooved spacer 43 is a component of a slotted core type telecommunications cable. One or more telecommunications elements, such as light waveguides or light waveguide ribbons, commonly known as optical fibers or optical fiber ribbons, will be inserted in the grooves of spacer 43, and spacer 43 is combined with other cable elements, such as waterblocking materials, strength members, and an outer jacket to form the cable. Spacer 43 typically consists of a central strength member 10 and a layer of plastic material 11 extruded over strength member 10. The longitudinal axis of the spacer is the same as the longitudinal axis of strength member 10. Strength member 10 may be formed of any of several materials, such as steel or glass reinforced plastic.

Plastic material 11 may be a single layer as shown, or alternatively may be a laminate of two or more layers of plastic material. Grooves 12 in plastic material 11 may have any of a variety of shapes bounded by spacer ribs 44, the most common being a U-shape to best accommodate one or more light waveguide ribbons to be inserted therein. The grooves commonly have either a reverse alternating lay or a simple helical lay as shown by grooves 12 of FIG. 1. The calibration device according to this invention is adapted to produce grooves having a simple helical lay. Grooves 12 each have a thread 41, and a binder is typically wrapped on surface 42 forming the outer diameter of spacer 43.

Figure 6:
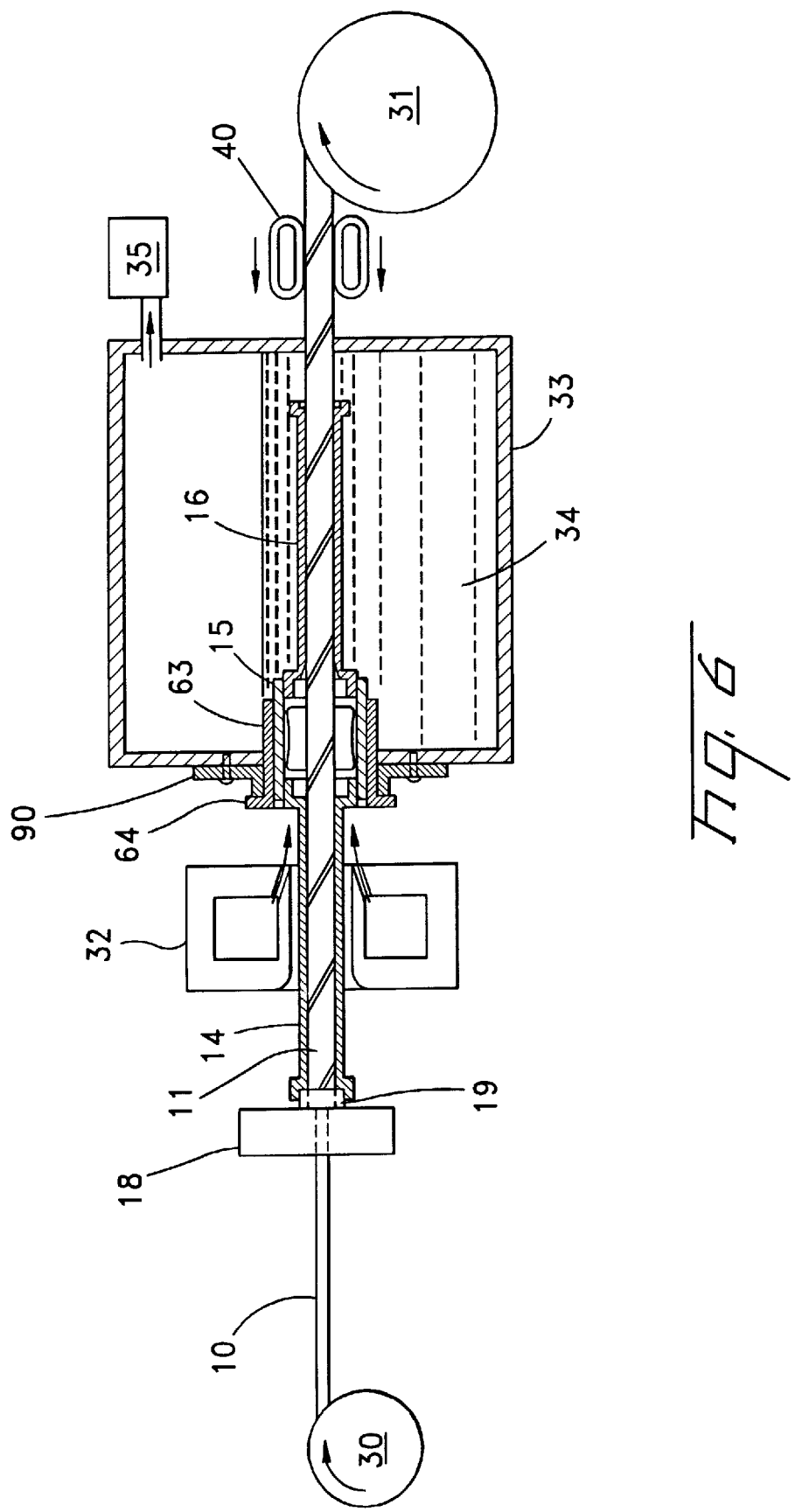
FIG. 6 is a schematic view of the calibration device as used in a manufacturing line.

With reference to FIG. 6, a grooved spacer is commonly manufactured by drawing the strength member 10 from a payoff reel 30 and passing strength member 10 through the crosshead of extruder 18. Extruder 18 extrudes a layer of plastic material 11 over strength member 10. The grooves 12 are formed in plastic material 11 through radially inwardly extending projections in extruder die 19. The formed grooved spacer is then passed through a cooling vat 33 holding a cooling material such as water 34, and the grooved spacer is then taken up on takeup reel 31. The direction from payoff reel 30 to cooling vat 33 will be called herein the throughput or downstream direction. A pulling device 40 may be used to draw the spacer from payoff reel 30. Pulling device 40 may be located between the cooling vat 33 and takeup reel 31. Other features in FIG. 6 will be discussed herein below as part of the invention.

Strength member 10 is normally rotated about its longitudinal axis by a gripping device either before or after it reaches extruder 18 to produce the helical shape of grooves 12, in which case payoff reel 30 and takeup reel 31 will be rotated to accommodate such motion. However, the helical shape may be produced by other means, such as rotation of components of the crosshead of extruder 18; the calibration apparatus according to the invention may be used regardless of the means of producing the helical shape of grooves 12. If the crosshead is rotated, then the calibration apparatus must also be rotated.

Figure 2:
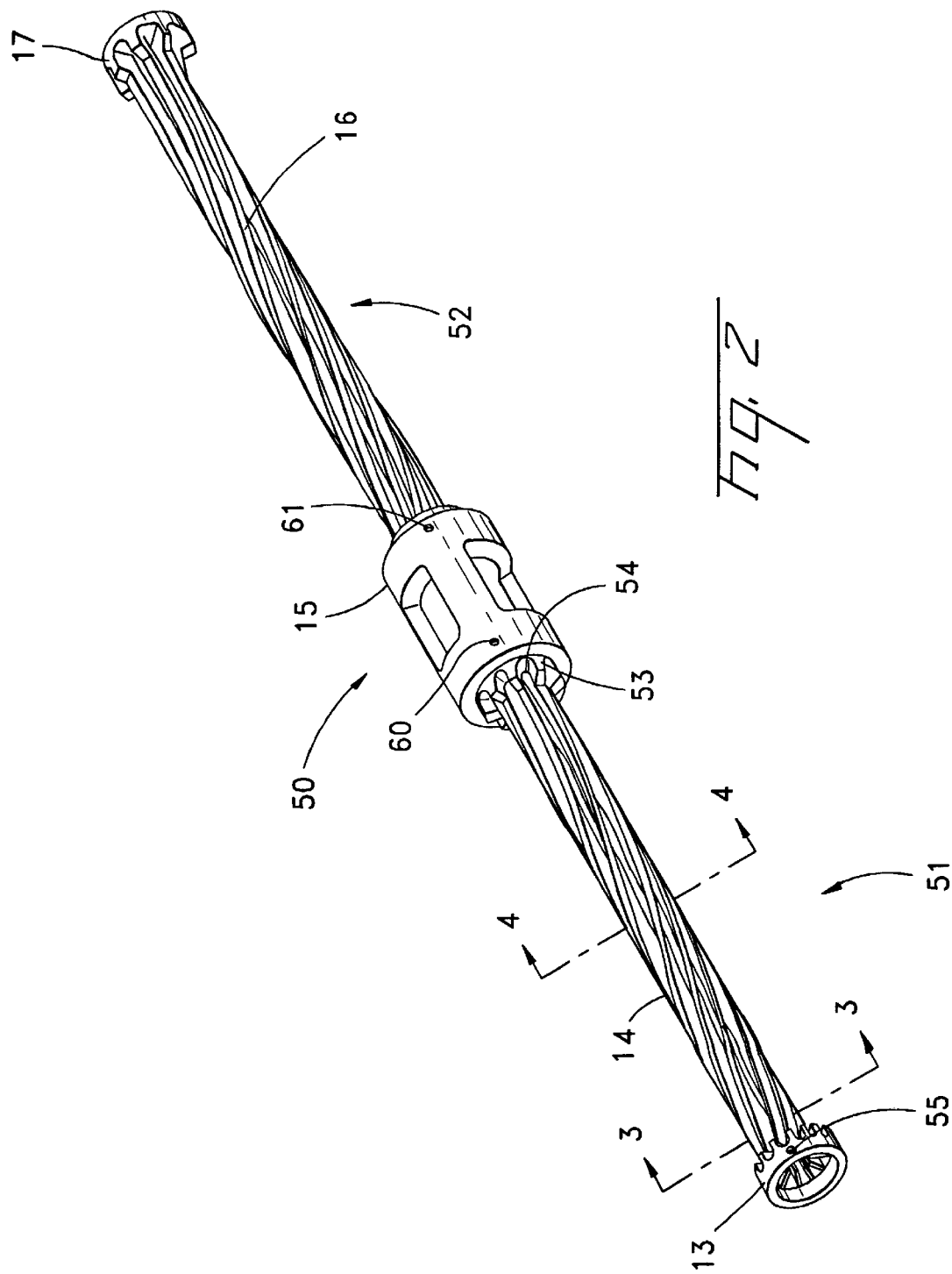
FIG. 2 is a perspective view of a calibration device according to the invention.
Figure 7:
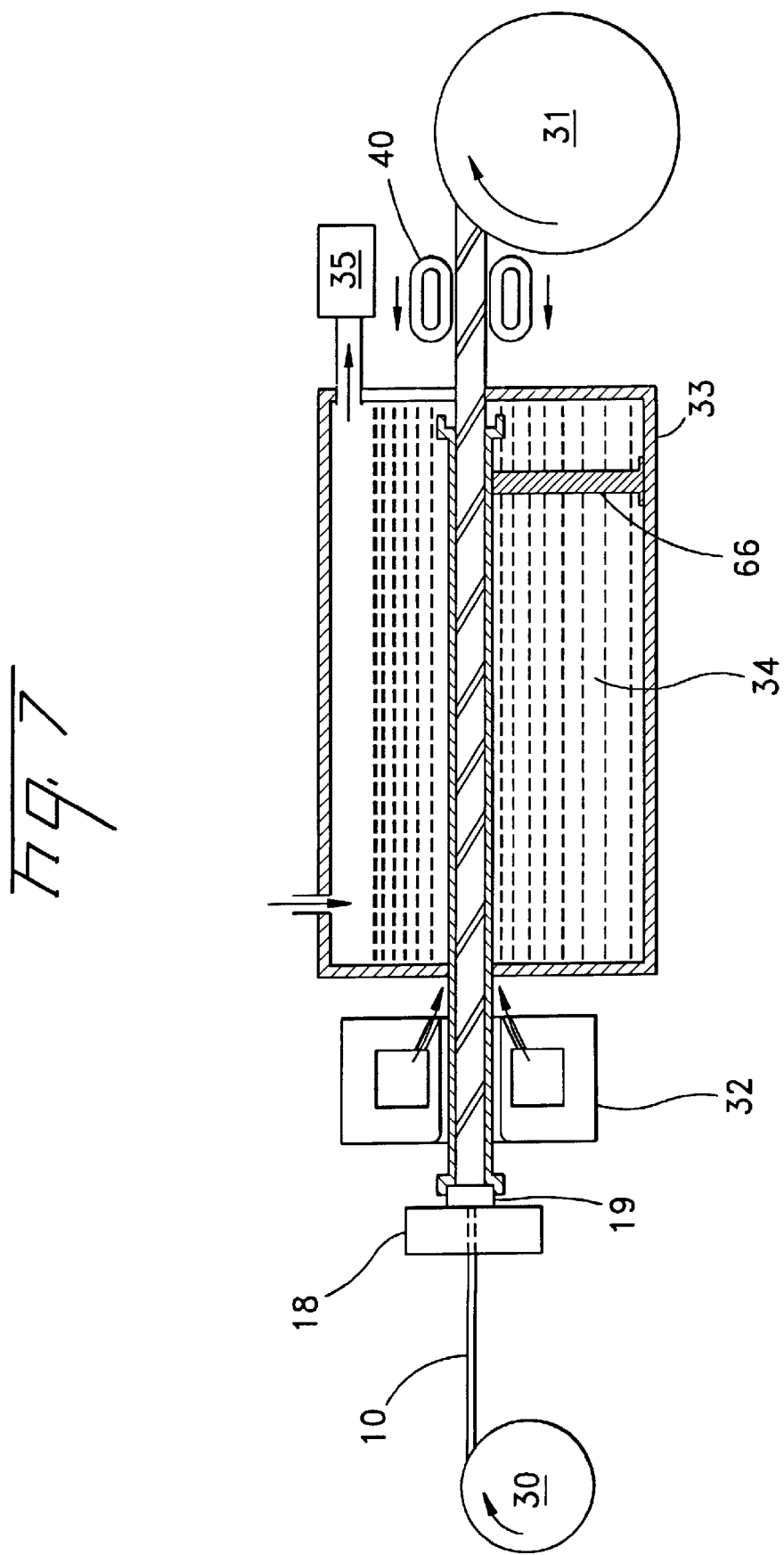
FIG. 7 is a schematic view of an alternate embodiment of the calibration device in use in a manufacturing line.

The calibration apparatus as shown in FIG. 2 may include a first calibration device 51 including calibration members 14, a second calibration device 52 including second calibration members 16, and a coupling 15 joining them. The calibration apparatus may be made as a single unit without a coupler as shown in FIG. 7, but the use of shorter calibration devices and a coupling may be necessary to produce a calibration apparatus of the desired length. The exterior shape of the calibration devices is produced by a lathe; a four axis milling machine may be used to produce the helical spaces between the calibration members; and a wire EDM device may be used to produce the central bore of a calibration device.

First calibration device 51 comprises calibration members 14 joining mounting members 13 and 53, while second calibration device 52 comprises calibration member 16 joining mounting members 59 and 17. Curved indentations 54 allow convenient removal of waste plastic material. Mounting member 13 is mounted to die 19 by screws inserted through holes 55,56 in mounting member 13. Coupling 15 is joined to calibration devices 51 and 52 through screws in holes 60 and 61. Coupling member 15 may alternatively be a C-shaped member clamped to the mounting members.

The length of the calibration apparatus depends upon the speed of the processing line, the type of plastic material forming at least the exterior layer of the spacer, and the temperature to which the plastic material is heated during extrusion. Examples will be found below.

Figure 5:
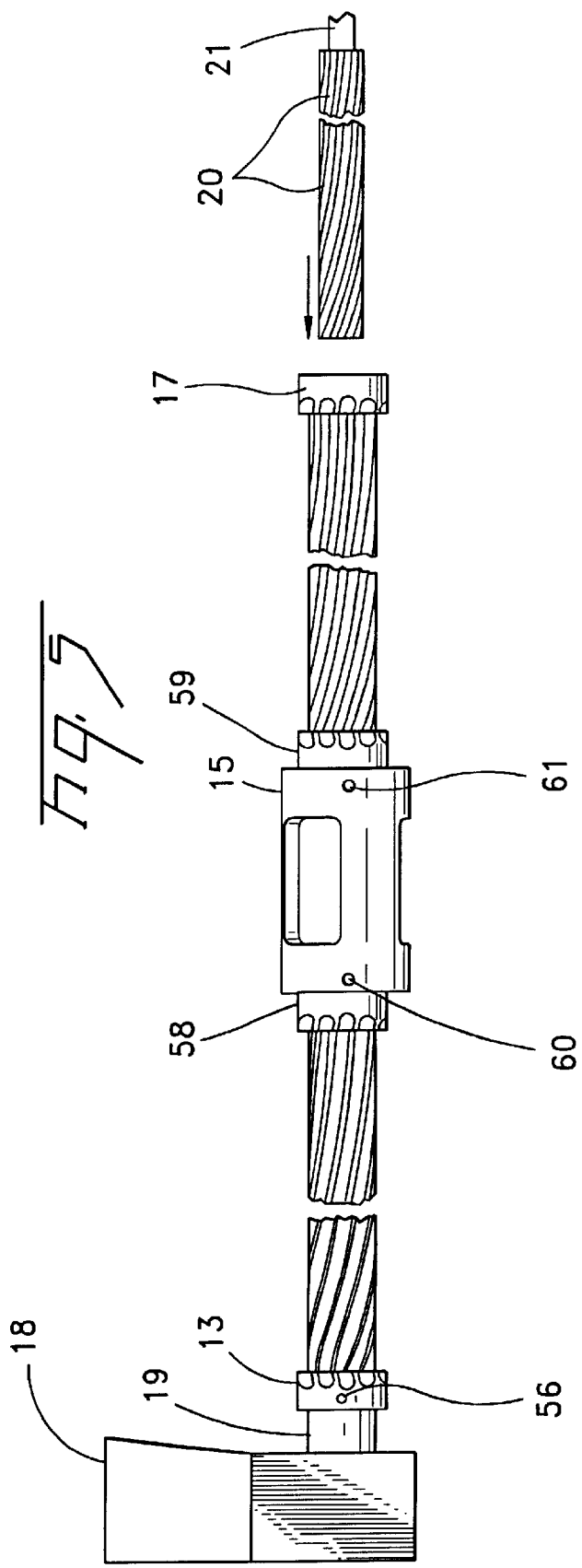
FIG. 5 is a side elevation view of the process for registration of the calibration device and the extruder die.

Before insertion of the mounting screws, the calibration device is aligned as shown in FIG. 5. A calibration rod 20, which has the same shape as the spacer to be manufactured, is inserted through the first and second calibration devices and to the exit passages of die 19. Rod 20 and its handle 21 are rotated as rod 20 is inserted. The angular positions of the calibration devices are adjusted as necessary to permit passage of rod 20, and the mounting screws are tightened to couple the second calibration device to coupler 15 and the first calibration unit to coupling 15 and die 19 when all components are in alignment. If helical passages in die 19 are provided, then rod 20 may be inserted a short distance within die 19. Rod 20 is then removed, undergoing rotation during removal.

Figure 3:
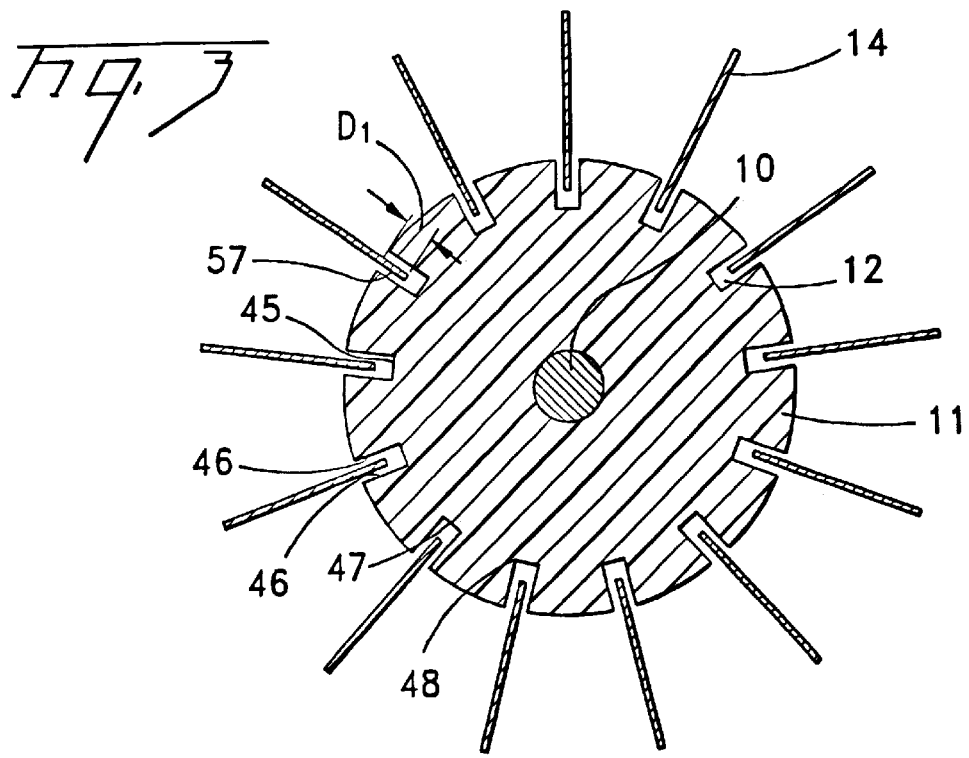
FIG. 3 is a sectional view of the calibration device and grooved spacer taken along line 3—3 of FIG. 1.
Figure 4:
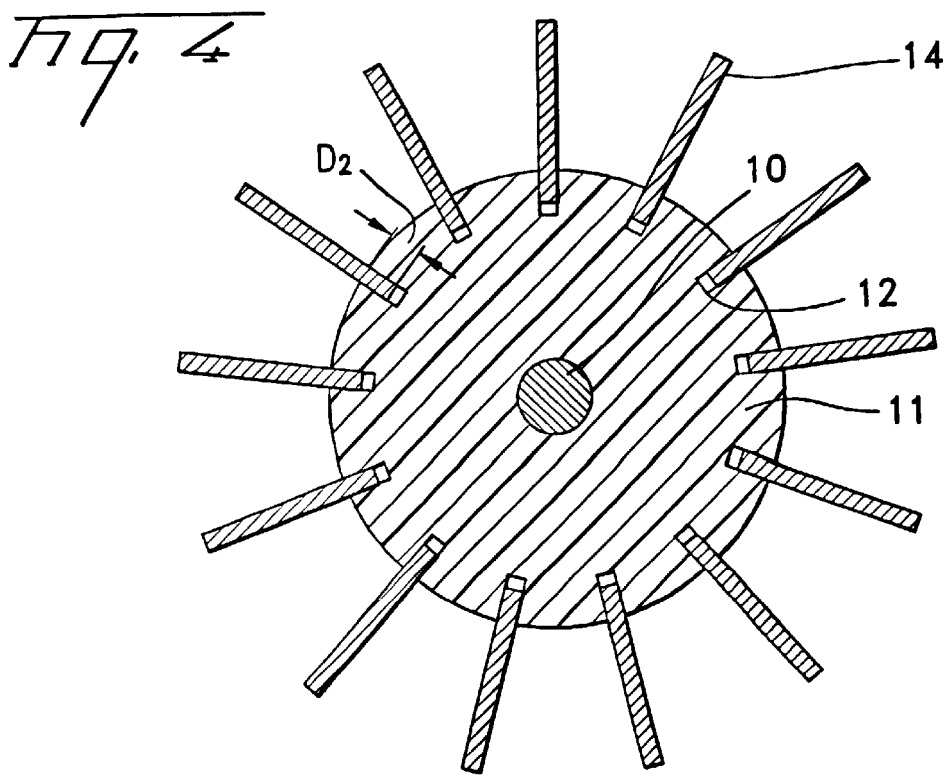
FIG. 4 is a sectional view of the calibration device and grooved spacer taken along line 4—4 of FIG. 1.

In order to minimize occurrences in which the extruded plastic material is dragged at the exit of die 19, more clearance is provided for the hot plastic melt forming material 11 at its exit from die 19, while less clearance is necessary thereafter. Reference is made to FIGS. 2, 3, and 4, with a section of the grooved spacer included in FIGS. 3 and 4 for clarification. Distal portions 57 of calibration members 14 are initially inserted into the respective grooves 12 to a depth $D_1$. As shown by a comparison of FIGS. 3 and 4, the depth of insertion in grooves 12 may gradually become larger over the interval between line 3—3 to line 4—4, as $D_2$ is greater than distance $D_1$; such is due to a gradual increase in the radial length of calibration members 14. The width of the respective calibration members 14 also may increase over the interval between line 3—3 to line 4—4. Thus, the cross-sectional area of the respective distal portions 57 decreases over the interval from line 4—4 to line 3—3; that is, in the direction opposite the throughput direction of the spacer. The cross-sectional area of the distal portions 57 may remain constant over the interval from line 4—4 to coupler 15.

The portion of a calibration member which is inserted into a groove 12 has a cross-sectional area less than the cross-sectional area of groove 12. An intended clearance is left between the calibration members and the floor 45 or 47 of a groove 12. However, the calibration members may contact sides 46 of grooves 12. The length of calibration members 14 is 10 cm or longer along the longitudinal axis of the spacer, and may be inserted into a spacer groove to a depth of 3.0 mm or more.

Figure 8:
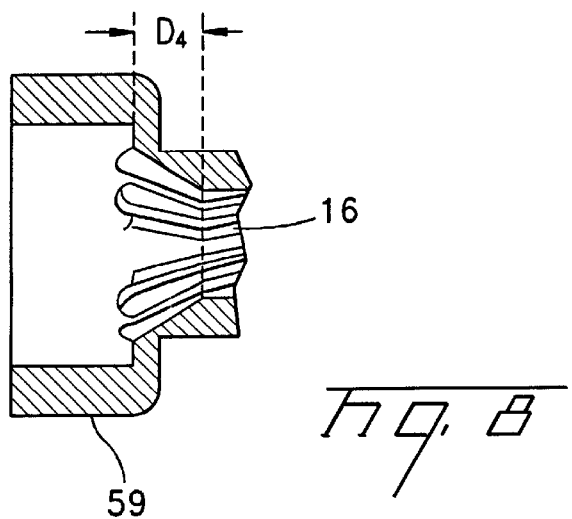
FIG. 8 is a longitudinal sectional view of the mounting member and upstream end of a second calibration device; and, FIG. 9 is a cross-sectional view of a cable which may be made using the invention.

Mounting member 50 of second calibration device 52 may include calibration members 16 which may be inclined at an angle of about sixty degrees from the horizontal axis over a distance $D_4$ as shown in FIG. 8 to decrease the risk of the spacer becoming lodged as it traverses between the two calibration devices.

A calibration apparatus is shown in FIG. 6 as it is used in a manufacturing line. An alternate embodiment with only a single calibration device supported by post 66 is shown in FIG. 7. A device 32, similar to that described in the Schneider reference, blows air as shown by arrows toward the entrance to cooling vat 33 to ensure that water 34 does not flow out along the calibration device or the grooved spacer to reach die 19. A vacuum pump device 35 may also be used to create a partial vacuum within cooling vat 33 to create an atmospheric pressure differential between the interior and the exterior of cooling vat 33, in order to inhibit the escape of water 34 along the spacer in the direction of die 19. Coupling 15 fits through a cylindrical slip ring 63 having a raised shoulder 64. Shoulder 64 abuts wall adapter 90 which is mounted to vat 33.

Figure 9:
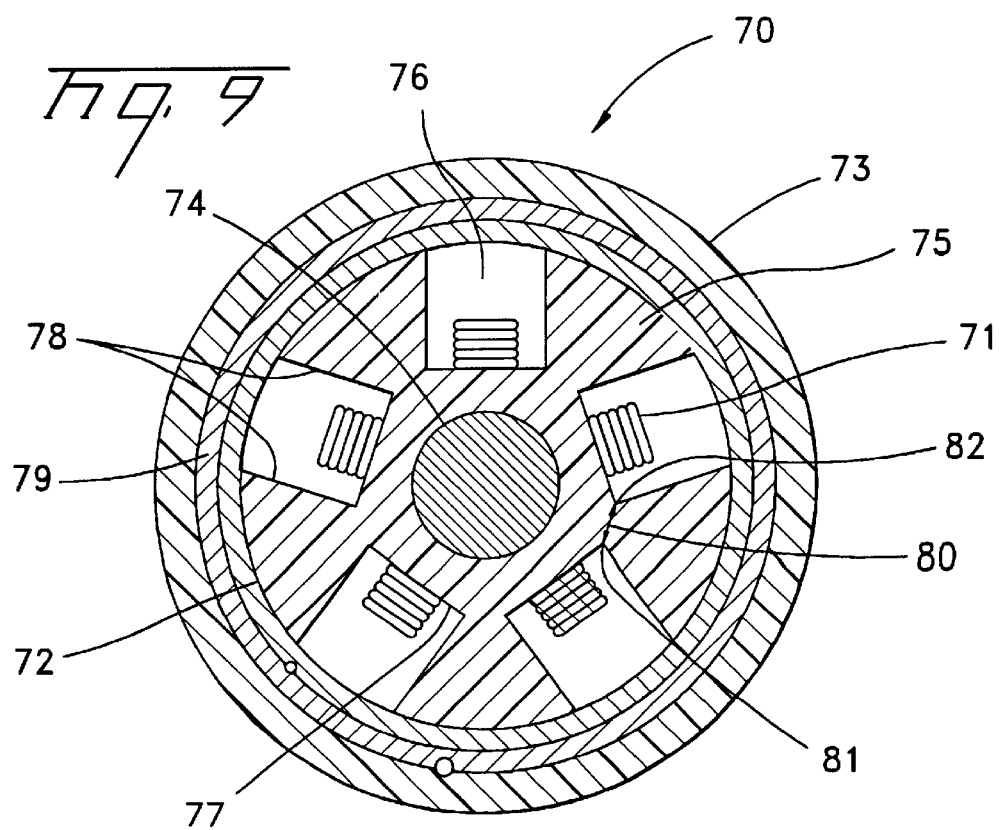

A cross-section of a cable 70 made using the calibration device is shown in FIG. 9. Spacer ribs 75 have a base width 80 lying between adjacent groove corners 81, 82. The root diameter of the spacer is the length of a line passing through the center of strength member 74 and reaching a groove floor 77. The outer diameter of the spacer reaches the outer extent of ribs 75, shown as surfaces 42 in FIG. 1. Grooves 76 are delimited by walls 78 formed by ribs 75, and each groove 76 holds a stack of optical fiber ribbons 71. The spacer is surrounded by a binder 72, a water-blocking tape 79, and an outer sheath 73.

TABLE 1

Parameters of examples of manufacturing lines making grooved spacers

|  |  | Example 1 | Example 2 | Example 3 | Example 4 |
|---|---|---|---|---|---|
| spacer | plastic material | MDPE blend | MDPE blend | MDPE blend | MDPE blend |
|  | melt flow index, g/10 min. | 0.65 | 0.65 | 0.65 | 0.65 |
|  | root diameter, mm | 16.1 | 6.9 | 7.2 | 9.6 |
|  | outer diameter, mm | 25.4 | 14.1 | 16.8 | 19.1 |
|  | groove width, mm | 2.7 | 2.5 | 3.8 | 2.7 |
|  | groove depth, mm | 4.5 | 3.5 | 4.3 | 4.8 |
|  | # of grooves | 14 | 6 | 5 | 8 |
|  | rib base width, mm | 1.0 | 1.1 | 1.1 | 1.2 |
| processing | line speed, m/min | 6 | 10 | 10 | 8 to 10 |
|  | temperature of extruded melt, °C. | 180–205 | 180–205 | 180–205 | 180–205 |
| calibration apparatus | # of calibration devices | two | two | one | two |
| calibration members | distance of initial taper, inches | 7 | 7 | 5 | 7 |
|  | initial width, mm | 1.5 | 2.5 | 2.0 | 1.5 |
|  | initial root diameter, mm | 19.0 | 9.5 | 10.0 | 12.5 |
|  | final width, mm | 2.5 | 2.5 | 3.8 | 2.5 |
|  | final root diameter, mm | 18.0 | 8.5 | 10.0 | 12.5 |

In the examples shown in Table 1 above, the distance of initial taper, initial width, and initial root diameter apply to the upstream portion of a first calibration device, such as shown between lines 3—3 and 4—4 of FIG. 2. The remainder of the first calibration device and a second calibration device, if any, have a width and root diameter corresponding to the final width and final root diameter. As applied to a calibration device, the term "root diameter" means the diameter of the bore of the calibration device between the radially inwardmost surfaces of the calibration members.

In example 1 above, the calibration members were untapered for a length of 1 inch and then tapered over a distance of six inches. Tapers were smooth for examples 2, 3, and 4.

It is to be understood that the invention is not limited to the exact details of the construction, operation, exact materials, or embodiments shown and described, as modifications and equivalents will be apparent to one skilled in the art without departing from the scope of the invention.

What is claimed is:

1. A method for making a longitudinally extending spacer having at least one longitudinally extending helical groove in plastic material forming an exterior surface thereof, into which groove a longitudinally extending telecommunications member may be inserted, comprising:

extruding the plastic material to form said spacer and forming with a die at least one helical groove in the exterior surface of said spacer; and, thereafter cooling the spacer and inserting at least a portion of a rigid, longitudinally extending, helically shaped first calibration member into said helical groove, the first calibration member tapering over at least a portion of its longitudinal extent and maintaining dimensional stability of said groove during said cooling.

2. A method for making a spacer as set out in claim 1, further comprising coupling the first calibration member to the die by a mounting member.

3. A method for making a spacer as set out in claim 1, further comprising coupling a coupler to the first calibration member, coupling a second rigid, helically shaped calibration member to the coupler, and inserting the second calibration member into the groove during such cooling.

4. A method for making a spacer as recited in claim 1, further comprising applying a partial vacuum to a cooling vat that receives and cools said spacer to create a pressure differential between the interior and exterior of said cooling vat.

5. A method for making a spacer for a fiber optic cable by operation of an extrusion die for expressing plastic melt therefrom in a helical direction of flow, and a calibration device with calibration members having helical spaces therebetween, said method comprising:

shaping with said die said plastic melt, said die having a helically shaped passage for imparting an initial momentum to the melt in the direction of the helical spaces between calibration members, and forming at least one groove in said plastic melt, the transverse cross section of at least one of said calibration members gradually increasing in size, and inserting into said groove at least a portion of at least one calibration member to maintain dimensional stability of said groove during cooling of the plastic melt subsequent to its extrusion.

6. The method of claim 5, wherein said calibration members are substantially non-flexible.

7. The method of claim 5, wherein at least one of said calibration members comprises a radially outermost surface.

8. The method of claim 5, wherein at least some of said calibration members comprise distal and proximal ends, said distal and proximal ends being connected together.

* * * * *